(12) United States Patent
Haba et al.

(10) Patent No.: US 6,273,495 B1
(45) Date of Patent: Aug. 14, 2001

(54) PLASTIC CROSS BEAM ASSEMBLY FOR A VEHICLE HAVING INTEGRALLY FORMED DUCT CONNECTORS

(75) Inventors: Charles A. Haba, Royal Oak; Paul G. Truman, Macomb, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/515,411

(22) Filed: Feb. 29, 2000

(51) Int. Cl.[7] .............................. B62D 25/08; B60H 1/26
(52) U.S. Cl. ...................... 296/194; 296/70; 296/208; 180/90; 454/143
(58) Field of Search .............................. 296/208, 70, 192, 296/194; 180/90; 454/143, 162

(56) References Cited

U.S. PATENT DOCUMENTS

| | | |
|---|---|---|
| 4,365,826 | 12/1982 | Iriyama . |
| 5,088,571 | 2/1992 | Burry et al. . |
| 5,354,114 | 10/1994 | Kelman et al. . |
| 5,364,159 | 11/1994 | Kelman et al. . |
| 5,527,581 | 6/1996 | Sugawara et al. . |
| 5,556,153 | 9/1996 | Kelman et al. . |
| 5,564,515 | 10/1996 | Schambre . |
| 5,673,964 | 10/1997 | Roan et al. . |
| 5,676,216 | 10/1997 | Palma et al. . |
| 5,685,598 | 11/1997 | Inoue et al. . |
| 5,762,395 | 6/1998 | Merrifield et al. . |
| 5,823,602 | 10/1998 | Kelman et al. . |
| 5,934,744 | 8/1999 | Jergens et al. . |
| 6,110,037 | * 8/2000 | Yoshinaka .............................. 454/143 |

* cited by examiner

Primary Examiner—Joseph D. Pape
(74) Attorney, Agent, or Firm—Brooks & Kushman P.C.

(57) ABSTRACT

A cross car structural support beam assembly is mounted between a pair of vehicle door pillars of a structural body of an automobile having an integrally formed male connecting snorkel projection for interfacing with air feeder tubes extending from ducts in the instrument panel assembly. The cross car beam assembly includes first and second plastic panels having at least one flow passage defined therebetween and at least one opening in the panels in fluid communication with the air flow passage. A third panel is mounted to the second panel to complete the cross car beam assembly and includes at least one tubular male connecting projection integrally formed into the outer surface of the third panel in fluid communication with the at least one air flow passage. The tubular male connecting projection interconnects with a tubular female connecting portion of an air feeder tube to supply air to a passenger compartment through ducts in an instrument panel assembly.

20 Claims, 4 Drawing Sheets

PLASTIC CROSS BEAM ASSEMBLY FOR A VEHICLE HAVING INTEGRALLY FORMED DUCT CONNECTORS

TECHNICAL FIELD

The present invention relates to a plastic cross car beam assembly protecting against lateral impact in a vehicle having integrally formed duct connectors for interfacing with outlet ducts in an instrument panel assembly.

BACKGROUND ART

In modern vehicle environments, a structural member called a cross car beam typically extends between the vehicle door pillars. The cross car beam provides rigidity against a lateral impact to either side of the vehicle. Typically, cross beams have been formed of metal. More recently, it has been proposed to utilize plastic materials to form the cross beams.

Cross car beams are designed to support instrument panel assemblies and interior components, such as heating ventilation or air conditioning (HVAC) systems, steering columns and the like. Additionally, air flow passages may be formed in cross car beams to direct air from the HVAC system to the outlet ducts formed in the instrument panel assembly to supply heated, cooled, or ambient air to the passenger compartment. One known prior art cross car member is formed of two plastic parts connected to define vehicle flow passages. The cross-sectional shape of the air flow passages through the cross beam changed along the length of the cross-beam. Thus, the cross car beam did not provide both sufficient structural support against lateral impacts and constant volume of air flow through the air flow passages of the cross car beam.

Another type of prior art cross car beam provides an injection molded cross car beam having a series of open channels formed in the beam to distribute air from the HVAC system to the outlet ducts in the instrument panel. The cross car beam is continuously joined to an interior surface of an instrument panel such that U-shaped duct channels in the cross car beam are generally aligned with outlet ducts formed in the instrument panel. This type of prior art cross car beam assembly does not provide a constant and efficient flow of air to the passenger compartment from the HVAC system.

A sealed duct structure is provided between the air flow passages in the cross car beam and the outlet ducts in the instrument panel assembly to ensure that a constant volume of air is received in the passenger compartment of a vehicle from the HVAC system. Prior art cross car beam and instrument panel assemblies typically required the use of a feeder tube extending from the outlet duct in the instrument panel to the outlet opening in the cross car beam to channel the air from the HVAC system. However, the feeder tube must be properly sealed between the cross car beam and the outlet ducts to ensure the constant volume flow of air to the passenger compartment.

One type of prior art feeder tube connection includes a feeder tube inserted through the outlet opening in the cross car beam which is the sealed to the inner surface of the air flow passage channel using a gasket or seal. However, this type of interface requires additional parts, labor and time during the assembly process. Another type of prior art feeder tube connection included a set of tabs or fingers molded into the feeder tube. The fingers are inserted through the outlet opening in the cross car beam and engage the inner surface of the air flow passage channel. However, creating the tabs or fingers in the feeder tube required additional labor time to cut each tab to interconnect with the outlet opening, which required an expensive an imprecise process of manufacturing.

It would be advantageous to provide a plastic cross car structural support beam assembly including a series of air flow passages of constant dimensions to provide air from the HVAC system to the outlet ducts in the instrument panel assembly. It would also be advantageous to provide a plastic cross car beam including an integrally formed snorkel or projection on the outer surface of the cross car beam at each outlet opening to provide an interface for the feeder tube extending from the outlet duct, ensuring efficient air flow and eliminating the need for gaskets or seals. Thus, it is the object of the present invention to provide a plastic cross beam which provides air flow passages through a cross-section which provides sufficient lateral impact support and includes an integrally formed snorkel projection to interface with the feeder tube of the outlet ducts of the instrument panel assembly.

DISCLOSURE OF INVENTION

The present invention overcomes the above-referenced problems associated with prior cross car structural support beam and instrument panel assemblies by providing a cross car structural support beam mounted between a pair of vehicle door pillars of a structural body of an automobile having an integrally formed male connecting snorkel projection for interfacing with air feeder tubes extending from ducts in the instrument panel assembly. The cross car beam assembly includes a first plastic panel having an outer surface and an inner structural surface including a first sealing area provided about the outer periphery of the first panel and an intermediate sealing area extending the length of the inner surface of the first panel. At least one channel is defined between the first sealing area and the intermediate sealing are extends the length of the inner surface of the first panel.

A second plastic panel is mounted adjacent the first panel. The second panel includes an inner structural surface having a second sealing area provided about the outer periphery of the second panel and an intermediate sealing area extending the length of the inner surface of the second panel. At least one channel is defined between the second sealing area and the intermediate sealing are extends the length of the inner surface of the second panel. Once assembled, the channels in the first and second panel define at least one air flow passage. At least one opening is defined through the outer surface of the second panel and is in fluid communication with the at least one channel of the second panel.

A third plastic panel is mounted adjacent the second panel. The third panel includes an inner structural surface securable to the outer surface of the second panel and an outer surface including at least one tubular male connecting projection integrally formed therein. The tubular male connecting projection is provided to connect the vents in an instrument panel assembly to the air flow passages in the cross car beam which are in fluid communication with a heating ventilation or air conditioning system.

The tubular male connecting portion of the third panel is mounted adjacent the at least one opening in the second panel and includes an outer periphery extending away from the outer surface of the third panel terminating at a distal end and an opening formed in the distal end extending therethrough in fluid communication with the at least one opening in the second panel. The tubular male connecting portion is non-circular in cross section and includes an outer periphery extending away from the outer surface of the third panel terminating at a distal end and an opening formed in the distal end extending therethrough in fluid communication with the at least one opening in the second panel.

An air feeder tube is provided between the cross car beam assembly and the instrument panel assembly to supply air from the heating ventilation or air conditioning system to the air ducts in the instrument panel assembly for the passenger compartment of the vehicle. The air feeder tubes include a proximate end in communication with vents in the instrument panel assembly and a distal end including a tubular female connector sized to telescopically fit over the at least one tubular male connecting projection of the cross car beam assembly to receive air from the heating ventilation or air conditioning system. The tubular female connector snap fits over the tubular male connecting projection on the cross car beam assembly to ensure a constant volume of air is supplied from the air flow passages in the cross car beam assembly to the air ducts in the instrument panel assembly The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
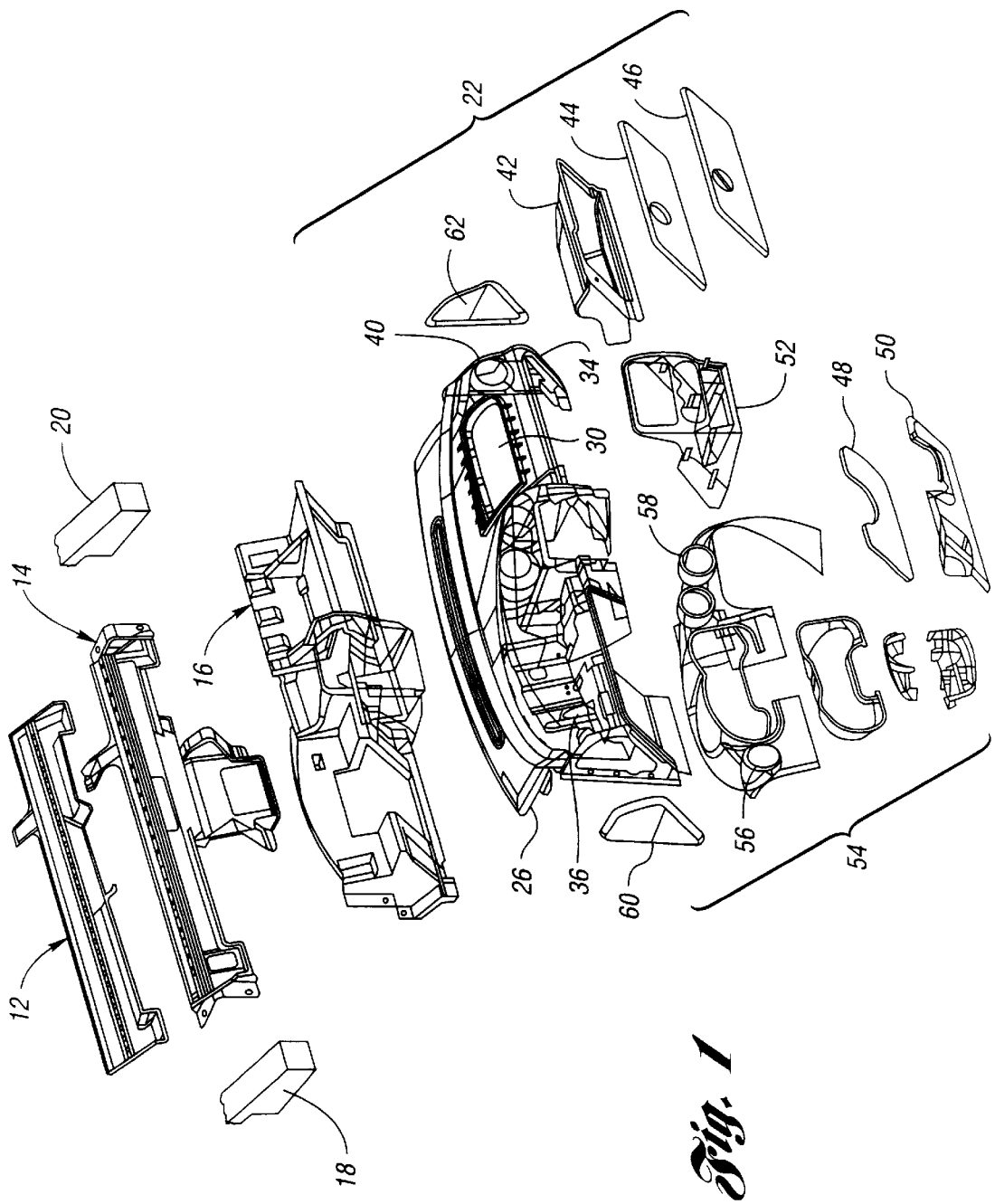
FIG. 1 shows an exploded perspective view of the plastic cross car beam assembly and instrument panel assembly for a vehicle in accordance with the present invention.

Referring now to FIG. 1, a cross car structural support beam assembly 10 for a vehicle is shown in accordance with the present invention. Cross car beam assembly 10 generally includes a first panel 12, a second panel 14 and a third panel 16. Once assembled, the cross car beam 10 is mounted between a pair of door pillars 18, 20 of a vehicle body. Vehicle door pillars 18, 20 are pillars provided at the intersection of the passenger and engine compartment frame forward of the vehicle doors in a vehicle cabin. Cross car beam 10 extends laterally between the pillars 18, 20 to provide sufficient stiffness and rigidity to the pillars 18, 20 to protect occupants of the vehicle against lateral impact in collisions.

An instrument panel assembly, generally shown as 22, is mounted to the cross car beam assembly 10 adjacent the third panel 16. Instrument panel assembly 22 extends laterally across the width of the passenger compartment of the vehicle between pillars 18, 20. The instrument panel assembly 22 includes a instrument panel pad 24 having an inner structural surface 26 and an outer decorative surface 28. Instrument panel pad 24 is generally formed or molded of a engineering plastic to provide sufficient structural characteristics to inner surface 26 and decorative or textured features to outer surface 28. Instrument panel pad 24 includes several openings corresponding to openings in cross car beam assembly 10 adapted to receive interior vehicle components and attachment of other instrument panel accessories. For example, the instrument panel may be molded with openings to receive an air bag module 30, a windshield defroster duct 32, a glove box 34 and a plurality of heating ventilation and air conditioning (HVAC) system outlet ducts or openings 36, 38, 40. Outlet ducts 36, 38, 40 are connected to the HVAC system via an air feeder tube or barrel (not shown) to direct air towards the passenger compartment. The interconnection of the outlet ducts to the HVAC system will be described in greater detail below.

As is seen in FIG. 1, a glove box compartment liner 42 is fastened to the third panel 16 of cross car beam assembly through glove box opening 34 in instrument panel pad 24. A glove box panel 44 including a cover skin 46 attached to the outer surface of the glove box panel 44 is pivotally attached to glove box compartment liner 42. A knee bolster 48 including a cover skin 50 is fastened to the cross car beam assembly 10 through a lower end of the driver's side of the instrument panel pad 24. Instrument panel pad 24 and knee bolster 48 include openings adapted to receive a steering column or the like (not shown).

Central stack portion 52 of instrument panel assembly 22 is designed to mount adjacent central console portion 53 in third panel 16 of cross car beam assembly 10. Central stack portion 52 support various components of an instrument panel, such as a radio, HVAC system controls and HVAC outlet ducts. Instrument cluster portion 54 is mounted to instrument panel pad 24 of instrument panel assembly 22 and provides a cover for vehicle controls, such as the speedometer and tachometer. Instrument cluster 54 includes a series of outlet openings 56, 58 which are mounted adjacent to outlet openings 36, 38 on instrument panel pad 24 when assembled. Side trim panels 60, 62 are attached to the ends of instrument panel pad 24 to cover access panels for electrical components of the instrument panel assembly 22 upon completion of the assembly of the instrument panel.

Figure 2:
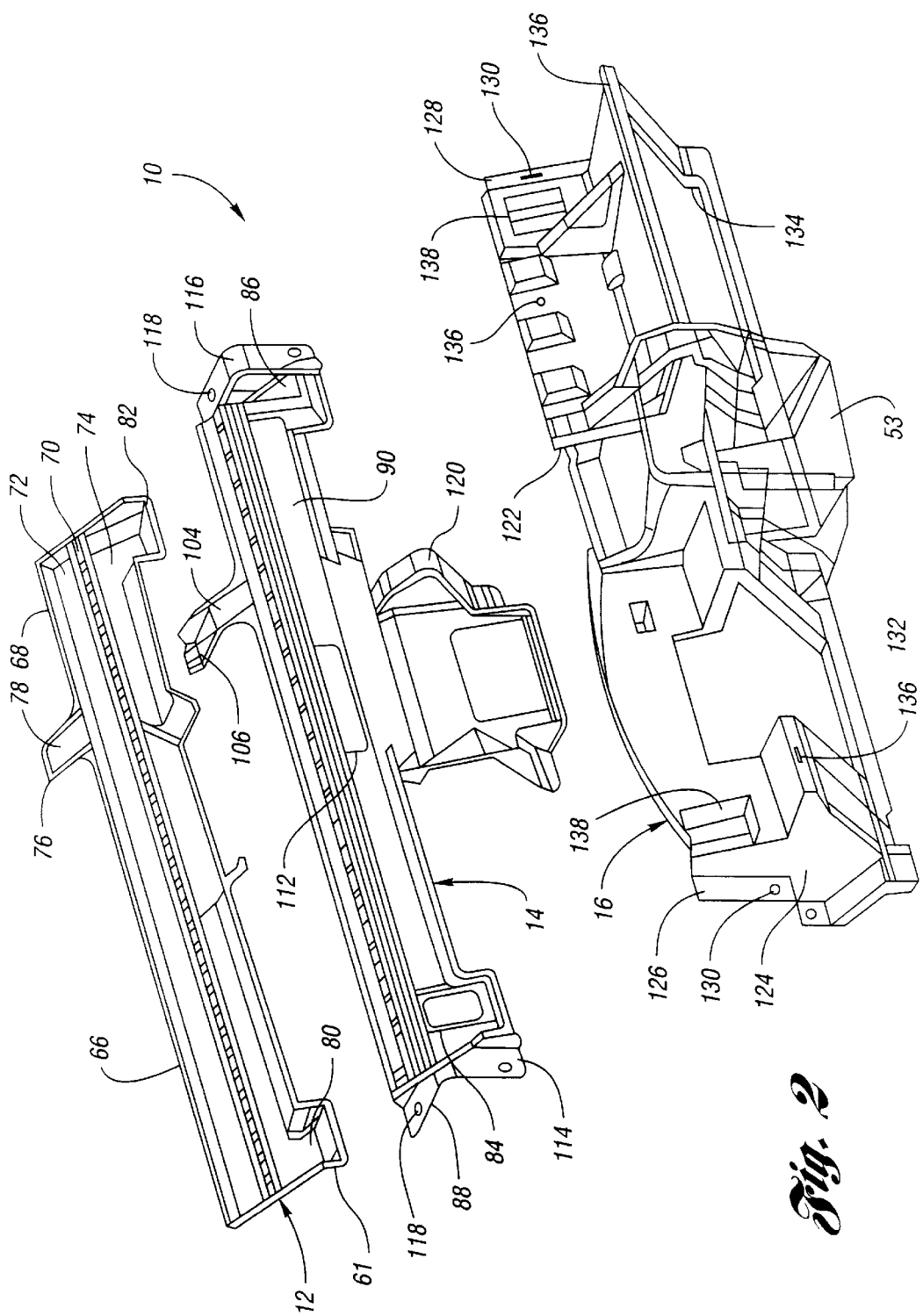
FIG. 2 shows an exploded perspective view of the plastic cross car beam assembly of the present invention.

Referring now to FIG. 2, an exploded view of the cross car beam 10 of the present invention is shown in greater detail. The cross car beam is comprised of a first panel 12, a second panel 14 and a third panel 16. In the preferred embodiment, the first panel 12, second panel 14 and third panel 16 of the cross car beam 10 are formed by an injection molded process using an engineering plastic, such as polycarbonate acrylonitrile butadiene styrene (PCABS) or the like.

The first panel 12 of cross car beam assembly 10 is molded to define an outer surface 64 and an inner surface 66. The inner surface includes a sealing area 68 formed about the outer periphery of inner surface 66 and an intermediate sealing area 70 extending substantially laterally across the entire length of the inner surface 66. A pair of channels 72, 74 are defined between a first sealing area provided about the outer periphery 66 and the intermediate sealing area 70 of the inner surface 66 of first panel 12. A flange 76 extends outwardly from an upper end of first panel 12 and includes a bolt area or opening 78 to receive a fastener or the like. A pair of channel extensions 80, 82 are defined at a lower edge of the first panel 12 adjacent channel 74 to form the lower portion of a pair of outlet openings 84, 86 for the heating ventilation and air conditioning (HVAC) system in cross car beam assembly 10.

The second panel 14 of cross car beam assembly 10 includes an inner surface 88 and an outer surface 90. In the preferred embodiment, inner surface 88 of second panel 14 is molded to include a second sealing area 92 provided about the outer periphery of second panel 14 and an intermediate sealing area 94 extending laterally across the second panel. A pair of channels 96, 98 are formed between the outer periphery second sealing area 92 and intermediate sealing area 94 corresponding in geometry and location to channels 72, 74 in first panel 12.

The inner surface 66 of first panel 12 is interconnected to the inner surface 88 of second panel 14 by a bonding process such as vibration welding, adhesive bonding or the like. When the first panel 12 and second panel 14 are interconnected, the outer periphery sealing areas and intermediate sealing areas of the first panel 12 and second panel 14 are secured such that channel 72 of first panel 12 and channel 96 of second panel 14 substantially form a first air flow passage 100 and channel 74 of first panel 12 and channel 98 of second panel 14 substantially form a second air flow passage 102. First and second air flow passages 100, 102 maintain a constant cross sectional shape across the lateral length of the cross car beam assembly 10 to ensure constant and efficient air flow volume from the HVAC system. It is well understood, however, that multiple air flow passages could be provided through the cross car beam assembly by molding additional corresponding channels in each of the first and second panels. It is also understood that the cross-section of the air flow passages could be altered to accommodate additional outlet openings or the like.

The outer surface 90 of second panel 14 includes a flanged member 104 extending from an upper end of second panel 14. Flanged member 14 includes an opening or bolt area 106 corresponding to bolt area 78 in flange 76 of first panel 12 to provide an additional assembly location for the cross car beam assembly 10. The pair of outlet openings 84, 86 are molded into the outer surface 90 of second panel 14 and extend through to second air flow passage 102. Outlet openings 84, 86 correspond with channel extensions 80, 82 in first panel 12 to provide air outlet ducts for the heating ventilation and air conditioning (HVAC) system. In a preferred embodiment of the invention, a central outlet opening 112 is formed through the outer surface 90 of second panel 14 to distribute air from second air flow passage 102 to a centrally located air duct system in instrument panel assembly 22.

The second panel 14 further includes a pair of flanged ends 114, 116 extending from side surfaces of the second panel 14. The flanged ends 114, 116 include a plurality of openings or bolt areas 118 which are adapted to receive a series of fasteners. In the preferred embodiment of the invention, the flanged ends are substantially L-shaped and are adapted to allow the first and second panels 12, 14 to be assembled to vehicle pillars 18, 20. Furthermore, the flanged ends are adapted to receive fasteners inserted through third panel 16. A mounting area 120 is molded at a lower end of second panel 14 to provide an additional mount location for third panel 16.

Third panel 16 of cross car beam assembly 10 is molded to be interconnected adjacent second panel 14 and to provide structural support to instrument panel assembly 22. The third panel 16 includes an inner surface 122 and an outer surface 124. In the preferred embodiment, inner surface 122 of third panel 16 is molded to be mounted with the outer surface 90 of second panel 14. The third panel 16 may be bonded or secured to the second panel by fasteners, or preferably, using a bonding process such as vibration welding or the like to complete the construction of the cross car beam assembly 10.

The third panel 16 of cross car beam assembly 10 includes a pair of flanged ends 126, 128 extending away from the third panel which include openings 130 corresponding to openings 118 in second panel 14. In the preferred embodiment, fasteners are inserted through openings 130 in flanged ends 126, 128 of the third panel 16 and flanged ends 114, 116 of second panel 14 to interconnect the cross car beam assembly 10 to vehicle door pillars 18, 20. Alternatively, fasteners can be inserted through openings 130 in the third panel 16 to attach the third panel 16 to the second panel 14 of cross car beam assembly 10.

Third panel 16 includes a receiving portion 132 formed on the driver's side of panel 16 to receive a steering column assembly (not shown). Stack portion 53 is centrally formed in the third panel 16 adjacent mounting area 110 of second panel 14 to receive HVAC system controls and the like. A glove box receiving portion 134 is formed in the passenger side of third panel 16 to receive glove compartment liner 42 of glove box assembly 40. A plurality of holes 136 are defined in the outer surface 124 of third panel 16 to receive and retain pin members (not shown) extending from an inner surface of 26 instrument panel pad 24. The inner surface 26 of instrument panel pad 24 of instrument panel assembly 22 may include integrally formed pin members which securely mount the instrument panel pad 24 to third panel 16 prior to the insertion of fasteners or the like to secure the instrument panel assembly to the cross car beam assembly 10.

Figure 5:
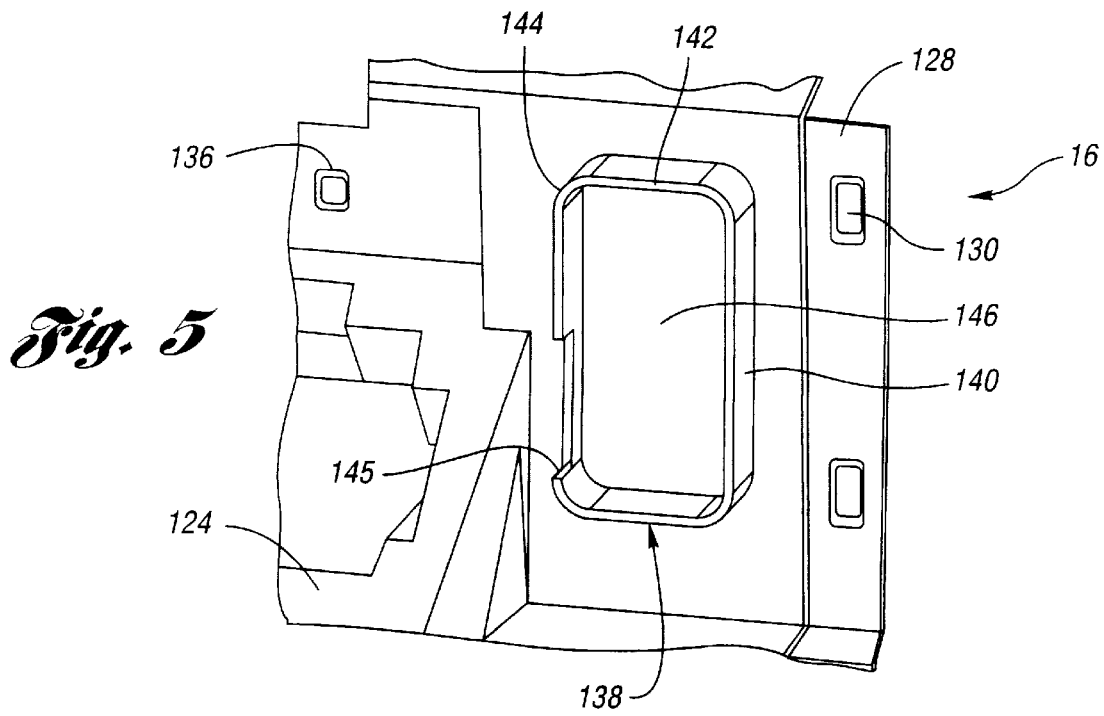
FIG. 5 shows perspective view of the snorkel projection integrally formed into the plastic cross car beam of the present invention.

Referring now to FIGS. 2 and 5, at least one snorkel projection 138 is integrally formed into the outer surface 124 of third panel 16. The at least one snorkel projection 138 is a tubular male connector member extending away from the outer surface of third panel 16 towards the instrument panel assembly 22. The snorkel projection 138 includes an outer periphery 140 terminating at a lip portion 142 at a distal end 144 of projection 138. A section 145 of the outer periphery 140 of the at least one snorkel projection is provided which is lower than the lip portion 142 provided at the distal end 144 of the projection to provide an adjustment area for installation of the air feeder tube from the instrument panel assembly.

The at least one snorkel projection includes an opening 146 extending through a central region of the projection 138 and is aligned with outlet openings 84, 86 in second panel 14 when the third panel 16 is attached to second panel 14 to complete the cross car beam assembly. The at least one snorkel projection 138 directs air from HVAC system connected to the cross car beam assembly 10 through the opening 146 in the distal end 144 of the projection for discharging air into to air feeder tube. In a preferred embodiment of the invention, the male connecting member snorkel projection 138 is non-circular in cross-section, as is seen in FIG. 5. However, it is understood that various geometries may also be used to form the snorkel projection based on the geometry of the outlet openings in both the second panel 14 and the instrument panel assembly 22.

Figure 3:
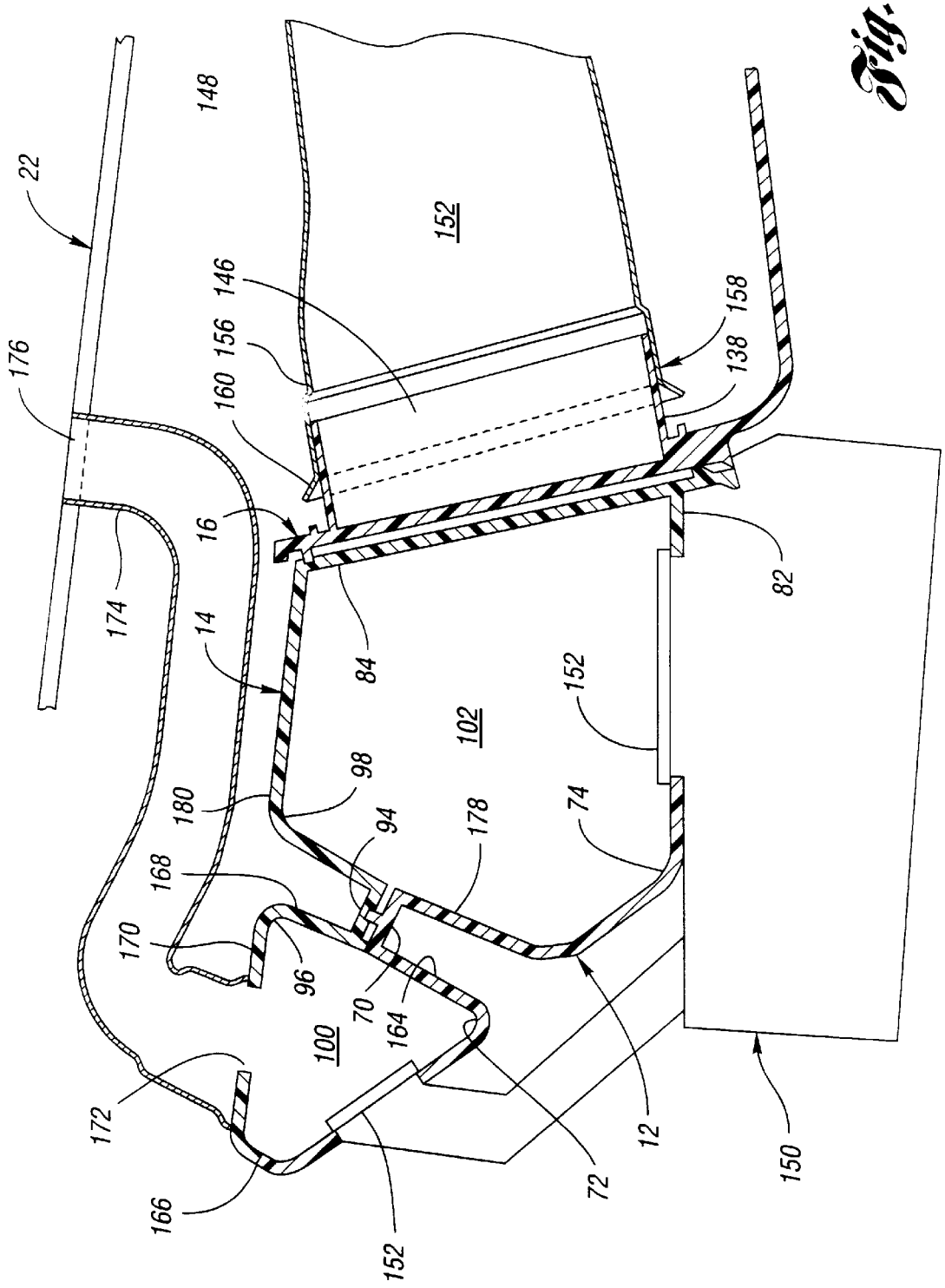
FIG. 3 shows a cross-sectional side view of the driver side of the plastic cross car beam assembled within a vehicle body adjacent an instrument panel assembly in accordance with the present invention.
Figure 4:
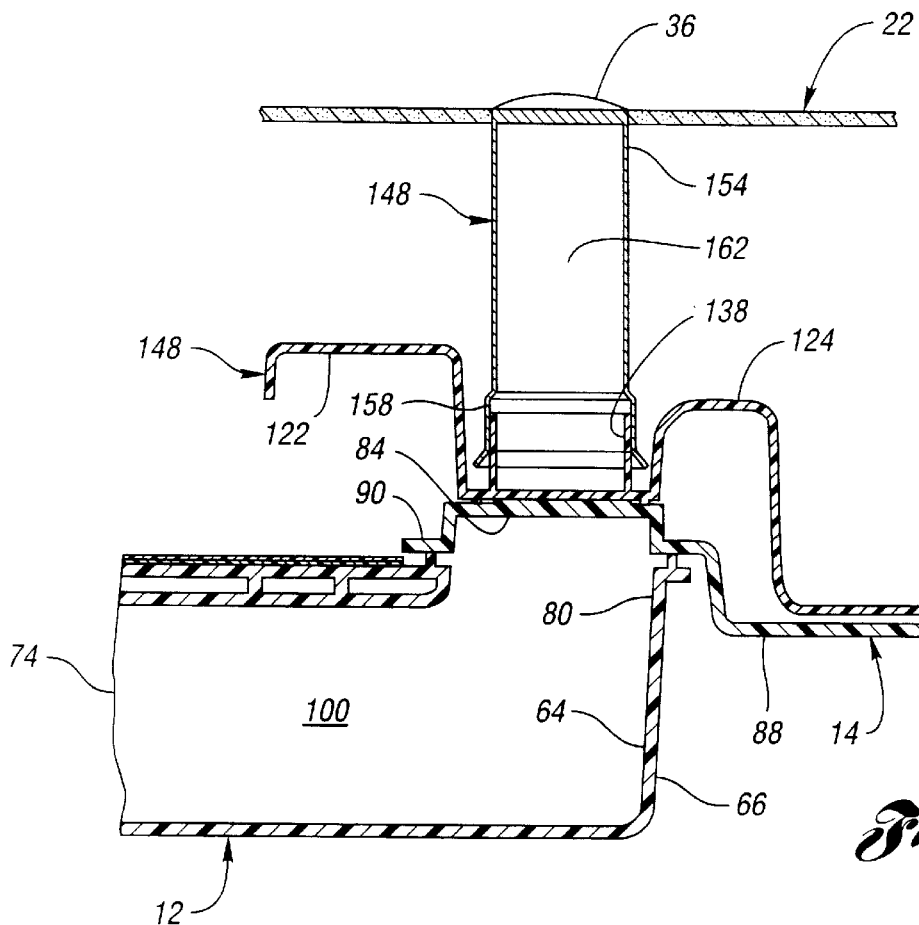
FIG. 4 shows a cross-sectional top view of the driver side of the plastic cross car beam assembled within a vehicle body adjacent an instrument panel assembly in accordance with the present invention.

Referring now to FIGS. 3 and 4, the assembly of the cross car beam 10 and the instrument panel assembly 22 is described in greater detail. A heating ventilation or air conditioning (HVAC) system 150 mounted in a vehicle is attached to an opening 152 in at least one of the first and second panels 12, 14. Thus, the HVAC system 150 supplies air to the first and second air flow passages 100, 102 of cross car beam assembly 10. As is shown in FIG. 4, air from the HVAC system 150 is directed through air flow passage 102 defined in between first and second panels 12, 14 towards outlet opening 84. When the third panel 16 of cross car beam assembly 10 is connected to second panel 14, snorkel projection 138 of third panel 16 is aligned with the outlet opening 84 of second panel 14.

Air duct feeder tube or barrel 148 includes a proximate end 154 extending from outlet duct 36 of instrument panel assembly 22 and a distal end 156 terminating at a tubular female connector member 158. Tubular female connector member 158 is sized to telescopically fit over the tubular male connecting member snorkel projection 138 of cross car beam assembly 10. In the preferred embodiment of the invention, the tubular female connector comprises the same geometry as the snorkel projection 138 and includes inner walls of the tubular female connector sized relatively larger than the corresponding outer periphery of the tubular male connector snorkel projection in order to provide a snap fit interconnection to bind the tubular sections together. Air duct feeder tube or barrel 148 is preferably formed by a blow molding process using an engineering plastic such as polyethylene or the like.

The tubular female connector 158 of air duct feeder barrel 148 includes an outwardly extending ring portion 160 which prevents debris from entering the passage 162 provided within air feeder barrel 148. The snap fit interconnection between the tubular female connector 158 of air feeder barrel 148 and the male connecting member snorkel projection 138 provides optimal air flow to the outlet ducts in instrument panel assembly 22 and ensures proper fit conditions between the air ducts connecting the cross car beam assembly 10 to the instrument panel assembly 22.

As is seen in FIG. 3, first and second panels 12, 14 channel 72 of first panel 12 and channel 96 of second panel generally define first air flow passage 100 which is generally triangular in cross-section. Channel 72 of first panel 12 is generally V-shaped and is formed by a lower portion 164 extending from intermediate sealing area 70 at a proximate end and an upper portion 166 extending away from the distal end of lower portion 164. The second panel 14 includes a first portion 168 having a proximate end connected to intermediate sealing area 94 and a second portion 170 extending from the distal end of first portion 168. In the preferred embodiment of the invention, first and second panels 12, 14 form an opening 172 above air flow passage 100 which supplies air from the HVAC system to an air feeder vent barrel 174 connected at a first end to the opening 172 and a demister duct 176 in the instrument panel assembly 22 at a second end.

Air flow passage 102 is defined by channel 74 of first panel 12 and channel 98 of second panel 14. Channel 74 of first panel 12 includes a first portion 178 extending away from intermediate sealing area 70 at a proximate end towards the HVAC system 150. The first portion 178 terminates at a distal end at channel extension 80 of outlet opening 84. In the preferred embodiment of the invention, an opening 152 is provided in the first portion 178 to receive air distributed from the HVAC system 150 to the air flow passage 102. Channel 98 of second panel 14 includes a structural portion 180 extending away from the intermediate sealing area 94 at a proximate end and terminating at outlet opening 84 at a distal end. The cross-sectional shape of the air flow passage 102 defined by channel 74 of first panel 12 and channel 98 of second panel 14 is generally polygonal in shape having more than three sides and provides a continuous volume of air to the outlet ducts of instrument panel assembly 22. However, it is understood that the geometrical cross-section of air flow passages 100, 102 may be changed and still provide proper flow characteristics for the HVAC system 150. Air flow passage 102 is primarily responsible for passing air from the HVAC system 150 to air duct feeder tube or vent barrel 148 connected to the passenger compartment outlet opening 36.

While the best mode for carrying out the invention has been described in detail, those familiar with the art to which this invention relates will recognize various alternative designs and embodiments for practicing the invention within the scope of the appended claims.

What is claimed is:

1. A cross car beam assembly for a vehicle comprising:
   a first plastic panel having an outer surface and an inner structural surface defining at least one channel extending the length of the first panel;
   a second plastic panel mounted adjacent the first panel, the second panel including an inner structural surface defining at least one channel extending the length of the second panel and an outer surface including at least one opening defined therethrough in fluid communication with the at least one channel of the second panel;
   at least one air flow passage defined by the at least one channel in the first panel and the at least one channel in the second panel when the inner surface of the first panel is mounted to the inner surface of the second panel;
   a third plastic panel mounted adjacent the second panel, the third panel including an inner structural surface securable to the outer surface of the second panel and an outer surface; and
   at least one tubular male connecting projection integrally formed into the outer surface of the third panel for connection to a vent into a passenger compartment of a vehicle;
   wherein the at least one tubular male connecting portion of the third panel is mounted adjacent the at least one opening in the second panel and includes an outer periphery extending away from the outer surface of the third panel terminating at a distal end and an opening formed in the distal end extending therethrough in fluid communication with the at least one opening in the second panel.

2. The cross car beam assembly of claim 1 wherein the inner structural surface of the first plastic panel further comprises a first sealing area disposed about the outer periphery of the first panel and an intermediate sealing area extending the length of the first panel.

3. The cross car beam assembly of claim 2 wherein a pair of channels are defined between the first sealing area disposed about the outer periphery of the first panel and an intermediate sealing area extending the length of the first panel.

4. The cross car beam assembly of claim 1 wherein the inner structural surface of the second plastic panel further comprises a second sealing area disposed about the outer periphery of the second panel and an intermediate sealing area extending the length of the second panel.

5. The cross car beam assembly of claim 4 wherein a pair of channels are defined between the second sealing area disposed about the outer periphery of the second panel and an intermediate sealing area extending the length of the second panel.

6. The cross car beam assembly of claim 1 wherein the first sealing area and the intermediate sealing area of the first panel are brought into sealing contact with the second sealing area and intermediate sealing area of the second panel to define a pair of air flow passages having an essentially constant cross sectional shape extending the length of the cross car assembly.

7. The cross car beam assembly of claim 6 wherein one of the pair of air flow passages has a generally triangular shape, and the other of the pair of air flow passages has a polygonal shape of more than three sides.

8. The cross car beam assembly of claim 1 wherein the first, second and third panels of the cross car beam assembly are formed of an engineering plastic.

9. The cross car beam assembly of claim 8 wherein the first, second and third panels of the cross car beam assembly are formed of polycarbonate acrylonitrile butadiene styrene.

10. The cross car beam assembly of claim 1 wherein the at least one tubular male connecting projection integrally formed into the outer surface of the third panel is non-circular in cross-section.

11. A vehicle comprising:
    an automobile body including a pair of opposed door pillars;
    a heating ventilation or air conditioning system affixed to the automobile body;
    a plastic cross car beam assembly extending between the pair of opposed door pillars in fluid communication with the heating ventilation or air conditioning system, the plastic cross car beam assembly comprising a first panel having at least one channel formed in the inner surface of the panel, a second panel mounted adjacent the first panel having at least one channel formed in the inner surface of the second panel and at least one opening defined in the outer surface of the second panel in fluid communication with the at least one channel of the second panel, at least one air flow passage defined by the at least one channel in the first and second panels in fluid communication with the heating ventilation or air conditioning system, and a third panel mounted adjacent the second panel including at least one tubular male connecting projection integrally formed into an outer surface of the third panel having an outer periphery extending away from the outer surface of the third panel terminating at a distal end and an opening formed in the distal end extending therethrough in fluid communication with the at least one opening in the second panel; and
    at least one air feeder tube in fluid communication with the plastic cross car beam assembly to supply air to a passenger compartment, the at least one air feeder tube having a proximate end in communication with a vent in the passenger compartment and a distal end including a tubular female connector sized to telescopically fit over the at least one tubular male connecting projection of the cross car beam assembly to receive air from the heating ventilation or air conditioning system.

12. The vehicle of claim 11 wherein the first panel of the plastic cross car beam assembly further comprises an outer surface and an inner structural surface including a first sealing area disposed about the outer periphery of the first panel and an intermediate sealing area extending the length of the first panel defining the at least one channel extending the length of the first panel.

13. The vehicle of claim 12 wherein a pair of channels are defined between the first sealing area disposed about the outer periphery of the first panel and an intermediate sealing area extending the length of the first panel.

14. The vehicle of claim 11 wherein the second panel of the plastic cross car beam assembly further comprises a second sealing area disposed about the outer periphery of the second panel and an intermediate sealing area extending the length of the second panel defining the at least one channel extending the length of the second panel.

15. The vehicle of claim 14 wherein a pair of channels are defined between the second sealing area disposed about the outer periphery of the second panel and an intermediate sealing area extending the length of the second panel.

16. The vehicle of claim 11 wherein the first sealing area and the intermediate sealing area of the first panel are brought into sealing contact with the second sealing area and intermediate sealing area of the second panel to define a pair of air flow passages having an essentially constant cross sectional shape extending the length of the cross car assembly, wherein one of the pair of air flow passages has a generally triangular shape, and the other of the pair of air flow passages has a polygonal shape of more than three sides.

17. The vehicle of claim 11 wherein the at least one tubular male connecting projection integrally formed into the outer surface of the third panel is non-circular in cross-section, wherein the tubular female connector of the at least one air feeder tube is provided with a complimentary non-circular cross-section to prevent relative rotation of the tubular female connector and the tubular male connector for a snap fit interconnection.

18. A cross car beam assembly for interfacing with an instrument panel having a plurality of air vent ducts to receive air from a heating ventilation or air conditioning system, the assembly comprising:
    a first plastic panel having an outer surface and an inner structural surface, wherein the inner surface comprises a first sealing area disposed about the outer periphery of the first panel and an intermediate sealing area extending the length of the first panel to define at least one channel extending the length of the first panel;
    a second plastic panel mounted adjacent the first panel, the second panel including an inner structural surface having a second sealing area disposed about the outer periphery of the second panel and an intermediate sealing area extending the length of the second panel to define at least one channel extending the length of the second panel and an outer surface including at least one opening defined therethrough in fluid communication with the at least one channel of the second panel;
    at least one air flow passage defined by the at least one channel in the first panel and the at least one channel in the second panel when the inner surface of the first panel is mounted to the inner surface of the second panel;
    a third plastic panel mounted adjacent the second panel, the third panel including an inner structural surface securable to the outer surface of the second panel and an outer surface;
    at least one tubular male connecting projection integrally formed into the outer surface of the third panel to supply air to the ducts in the instrument panel assembly, wherein the at least one tubular male connecting portion of the third panel is mounted adjacent the at least one opening in the second panel and includes an outer periphery extending away from the outer surface of the third panel terminating at a distal end and an opening formed in the distal end extending therethrough in fluid communication with the at least one opening in the second panel; and
    at least one air feeder tube corresponding to the at least one male connecting member to supply air to the air ducts in the instrument panel assembly, the at least one air feeder tube having a proximate end in communication with the vent in the instrument panel assembly and a distal end including a tubular female connector sized to telescopically fit over the at least one tubular male connecting projection of the cross car beam assembly to receive air from the heating ventilation or air conditioning system.

19. The assembly of claim 18 wherein the first sealing area and the intermediate sealing area of the first panel are brought into sealing contact with the second sealing area and intermediate sealing area of the second panel to define a pair of air flow passages having an essentially constant cross sectional shape extending the length of the cross car assembly, wherein one of the pair of air flow passages has a generally triangular shape, and the other of the pair of air flow passages has a polygonal shape of more than three sides.

20. The cross car beam assembly of claim 18 wherein the at least one tubular male connecting projection integrally formed into the outer surface of the third panel is non-circular in cross-section, wherein the tubular female connector of the at least one air feeder tube is provided with a complimentary non-circular cross-section to prevent relative rotation of the tubular female connector and the tubular male connector for a snap fit interconnection.

\* \* \* \* \*